United States

[11] 3,633,995

| [72] | Inventors | Eric G. Lean<br>Mahopac;<br>Keith S. Pennington, Somers; Robert V. Pole; Carl G. Powell, both of Yorktown Heights, all of N.Y. |
|---|---|---|
| [21] | Appl. No. | 12,004 |
| [22] | Filed | Feb. 17, 1970 |
| [45] | Patented | Jan. 11, 1972 |
| [73] | Assignee | International Business Machines Corporation<br>Armonk, N.Y. |

[54] ACOUSTO-OPTIC LIGHT DEFLECTION SYSTEM
8 Claims, 3 Drawing Figs.

[52] U.S. Cl.................................................. 350/161, 331/94.5
[51] Int. Cl.................................................... G02f 1/28, H01s 3/00
[50] Field of Search.......................................... 350/160, 161, 295; 331/94.5

[56] ...ed
UNITED STATES PATENTS

| 3,174,044 | 3/1965 | Tien | 332/7.51 |
| 3,297,876 | 1/1967 | De Maria | 332/7.51 |

*Primary Examiner*—Ronald L. Wibert
*Assistant Examiner*—V. P. McGraw
*Attorneys*—Hanifin and Jancin and John J. Goodwin

ABSTRACT: A system for deflecting a light beam such as a laser beam including a crystal substrate, preferably piezoelectric, having a reflective coating on its surface which functions as a mirror. At least one surface acoustic wave transducer is mounted on the crystal and is actuated by a high-frequency signal source. The transducer propagates surface acoustic waves on the crystal, which produce a periodic deformation on the mirror surface which functions as a phase grating. A light beam directed onto the mirror surface will therefore be deflected at an angle dependent on the acoustic frequency of the surface waves. A plurality of transducers arranged approximately in a semicircle on the crystal and selectively actuated provides a two-dimensional scanning system.

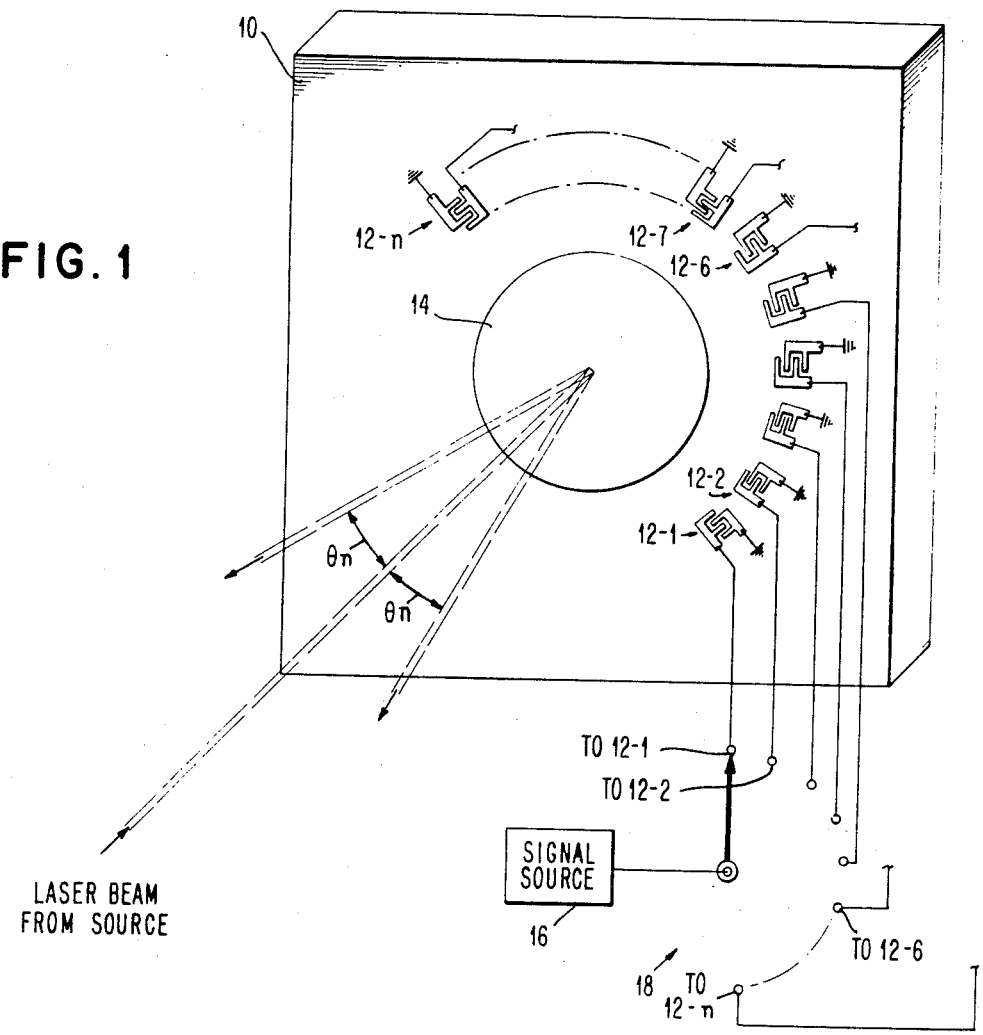
FIG. 1
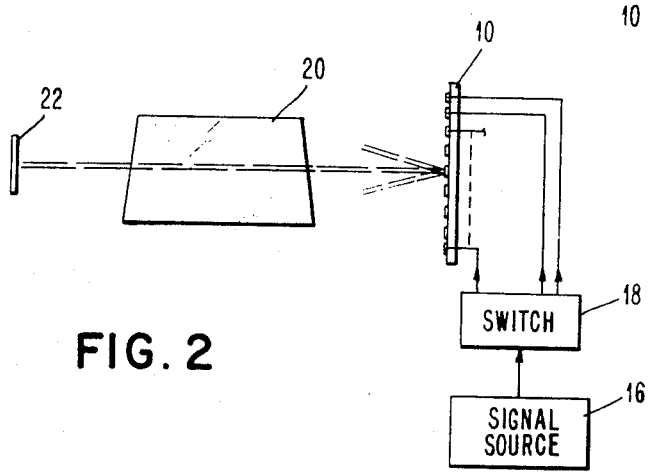
FIG. 2
FIG. 3
INVENTORS
ERIC G. LEAN
KEITH S. PENNINGTON
ROBERT V. POLE
CARL G. POWELL
BY John J. Goodwin
ATTORNEY

# ACOUSTO-OPTIC LIGHT DEFLECTION SYSTEM

BACKGROUND OF THE INVENTION

1. Field of the Invention

The present invention relates to acoustic transducers as light deflectors and more particularly to the use of acousto-optic surface wave transducers for deflecting laser light.

2. Description of the Prior Art

Acoustic cells have been employed in the prior art to deflect and modulate light. U.S. Pat. No. 3,297,876, issued Jan. 10, 1967 to A. J. DeMaria; and U.S. Pat. No. 3,174,044, issued Mar. 16, 1965 to P. K. Tien are illustrative of the prior art.

In the prior art the deflection is caused by bulk ultrasonic waves propagated in the volume of the cell. The present invention is distinct in that surface acoustic waves are propagated which produce periodic deformation of a mirror surface to cause deflection. The prior art devices can deflect only in one dimension whereas the present invention provides a system to deflection in two dimensions.

SUMMARY

An object of the invention is to provide an acousto-optic light deflection apparatus for deflecting laser light either inside or outside a laser cavity.

Another object is to provide an acousto-optic light deflection device which may be employed as one or both end mirrors of a laser cavity.

The foregoing and other objects, features, and advantages of the invention will be apparent from the following more particular description of preferred embodiments of the invention, as illustrated in the accompanying drawings.

FIG. 1 is a schematic illustration of an acousto-optic light deflection system.

FIG. 2 is an illustration of the system of FIG. 1 employed as a component of a laser cavity.

FIG. 3 is an illustration of another embodiment of an acousto-optic light deflection system.

Referring to FIG. 1, an acousto-optic deflection system is shown including a crystal substrate 10 capable of supporting surface acoustic waves which is preferably a piezoelectric crystal. The substrate 10, for example, can be either C-cut zinc oxide or cadmium sulfide, which are isotropic acoustically or lithium niobate or quartz which have to be compensated for angular anisotropic properties.

A plurality of acoustic transducers 12–1 through 12–n are arranged in approximately semicircular arrays on crystal 10. The transducers 12–1 through 12–n are preferably interdigital transducers consisting of two interleaved metallic combs fabricated on the surface of crystal 10 by photoresist techniques.

A high reflectivity coating 14 is provided on a portion of the surface of crystal 10, preferably but not necessarily in the center of the array of transducers. The reflective coating 14 functions as a mirror. Each of the transducers 12–1 through 12–n may be selectively connected to a signal source 16. For purposes of illustration, the connecting means is shown as a simple multicontact mechanical switch 18 but in practice may be any suitable means for applying a signal to a transducer. Signal source 16 generates a signal at microwave frequencies.

In the embodiment of FIG. 1 when one of the transducers 12–1 through 12–n is connected to signal source 16 the transducer causes surface acoustic waves to propagate across the reflective surface 14 in a radial direction dependent on the position of the selected transducers. A laser beam from a suitable source is directed onto the reflective surface 14 as illustrated in FIG. 1. The surface acoustic waves propagating on reflective surface 14 produce a periodic deformation on surface 14, which functions as a phase grating for the laser beam and the laser beam is deflected. The phase grating diffracts the laser light into many orders with the angular dependence for the nth order as follows:

$$\sin \theta_n = n \frac{\lambda}{\Lambda} = n \frac{\lambda}{\nu} f$$

where $\theta_n$ is the diffracted angle of the nth order, $\Lambda$, $\nu$, and $f$ are the acoustic wavelength, velocity, and frequency respectfully, and $\lambda$ is the optical wavelength. The intensities of the diffracted light follow Bessel function distribution and the first order ($n=1$ or $n=-1$) diffracted beams are most significant. By varying the acoustic frequency, the $n=1$ diffracted beam scans through an angle given by:

$$\Delta \theta_1 = \frac{\lambda}{\nu \cos \theta_1} \Delta f$$

Thus, by selecting the proper frequency $f$ the position of the diffracted beams can be controlled in one dimension and by connecting the signal from source 16 the position of the diffracted beams can be controlled in a second dimension.

The deflection system of FIG. 1 may be employed in a laser cavity to function as either one or both end mirrors of the cavity. Referring to FIG. 2, the crystal 10 is shown in combination with an active laser medium 20 and a conventional cavity mirror 22. The reflective coating on crystal 10 serves as the other cavity mirror. Excitation of active medium 20 produces stimulated emission of light which is reflected back and forth in the cavity. By connecting a signal from source 16 at a selected frequency to a selected transducer, the light in the cavity can be caused to scan or be diffracted out of the cavity in a desired direction.

In the structure of FIG. 1, the reflective coating 14 is shown located on the same surface as the transducers 12–1 through 12–n. This is not a restriction and other configurations are possible, for example, transducers 12–1 through 12–n may be located on the other side of the crystal.

Referring to FIG. 3, another configuration of the deflection system is shown wherein crystal 10 is in the form of a prism with reflective coating 14 located on the bottom surface 24. One or more of the transducers 12–1 through 12–n are located on the inclined surface 26. When the transducers are not actuated, the light beam is directed through surface 28 and reflected internally from surface 26 onto reflective coating 14, which reflects the beam back along the same path. When a transducer is actuated, the internal reflection is frustrated due to the periodic deformation of surface 26 and the light beam is deflected out through surface 26 at an angle determined by the acoustic frequency. The transducers of the structure shown in FIG. 3 are connected through a switch to a signal source (not shown) in the same manner as the transducers of FIG. 1.

The structure of FIG. 1 also shows the transducers 12–n arranged such that the light beam is deflected along the radial directions of a full circle. Depending on the desired application, the number and placement of the transducers may be varied. For example, if deflection in only one dimension is desired, only one transducer may be employed on crystal 10.

While the invention has been particularly shown and described with reference to preferred embodiments thereof, it will be understood by those skilled in the art that various changes in form and details may be made therein without departing from the spirit and scope of the invention.

What is claimed is:

1. An apparatus for deflecting a light beam in a selected direction comprising:
    a crystal capable of supporting surface acoustic waves,
    a reflective coating disposed on a portion of a surface of said crystal, said reflective coating being in the path of a light beam,
    at least one surface wave acoustic transducer disposed on a surface of said crystal;
    and a source of electrical signal having a selected frequency connected to said at least one transducer for actuating said transducer to propagate surface acoustic waves in said crystal, said surface acoustic waves producing a surface deformation of said crystal surface which deflects said light beam at an angle determined by said frequency of said electrical signal.

2. An apparatus according to claim 1 wherein said reflective coating and said at least one transducer are on the same surface of said crystal, and wherein said propagated surface acoustic waves produce a deformation of said surface having said reflective coating.

3. An apparatus for deflecting a light beam according to claim 1 wherein said crystal is a prism having a triangular cross section, said reflective coating being on one surface of said crystal and said at least one transducer being on another surface of said crystal.

4. An apparatus for deflecting a light beam according to claim 1 wherein a plurality of surface wave acoustic transducers are disposed in an array on the surface of said crystal;
and including means for selectively connecting said source of electrical signal separately to each of said transducers.

5. An apparatus for deflecting a light beam according to claim 4 wherein said plurality of surface wave acoustic transducers are arranged in a substantially semicircular array around said reflective coating, said transducers being each separately actuated to deflect said light beam in a different radial direction.

6. A laser cavity comprising an active laser medium for producing a beam of laser light by stimulated emission and first and second reflective means positioned on opposite sides of said active laser medium for reflecting said beam of laser light,
at least one of said reflective means being a crystal having a reflective coating on a portion of the crystal surface opposite said active medium,
at least one surface wave acoustic transducer disposed on the surface of said crystal, and a source of electrical signal connected to said at least one acoustic transducer for actuating said transducer to propagate surface acoustic waves in said crystal, said surface acoustic waves producing surface deformation of said reflective coating which deflects said beam of laser light.

7. An apparatus for deflecting a light beam according to claim 6 wherein a plurality of surface wave acoustic transducers are disposed in an array on the surface of said crystal,
and including means for selectively connecting said source of electrical signal separately to each of said transducers.

8. An apparatus for deflecting a beam of laser light according to claim 7 wherein said plurality of surface wave acoustic transducers are arranged in a substantially semicircular array around said reflective coating, said transducers being each separately actuated to deflect said input beam in a different radial direction.

* * * * *